Aug. 14, 1945.　　　　E. A. ROCKWELL　　　　2,382,444
POWER UNIT APPARATUS
Filed July 3, 1940　　　　7 Sheets-Sheet 1
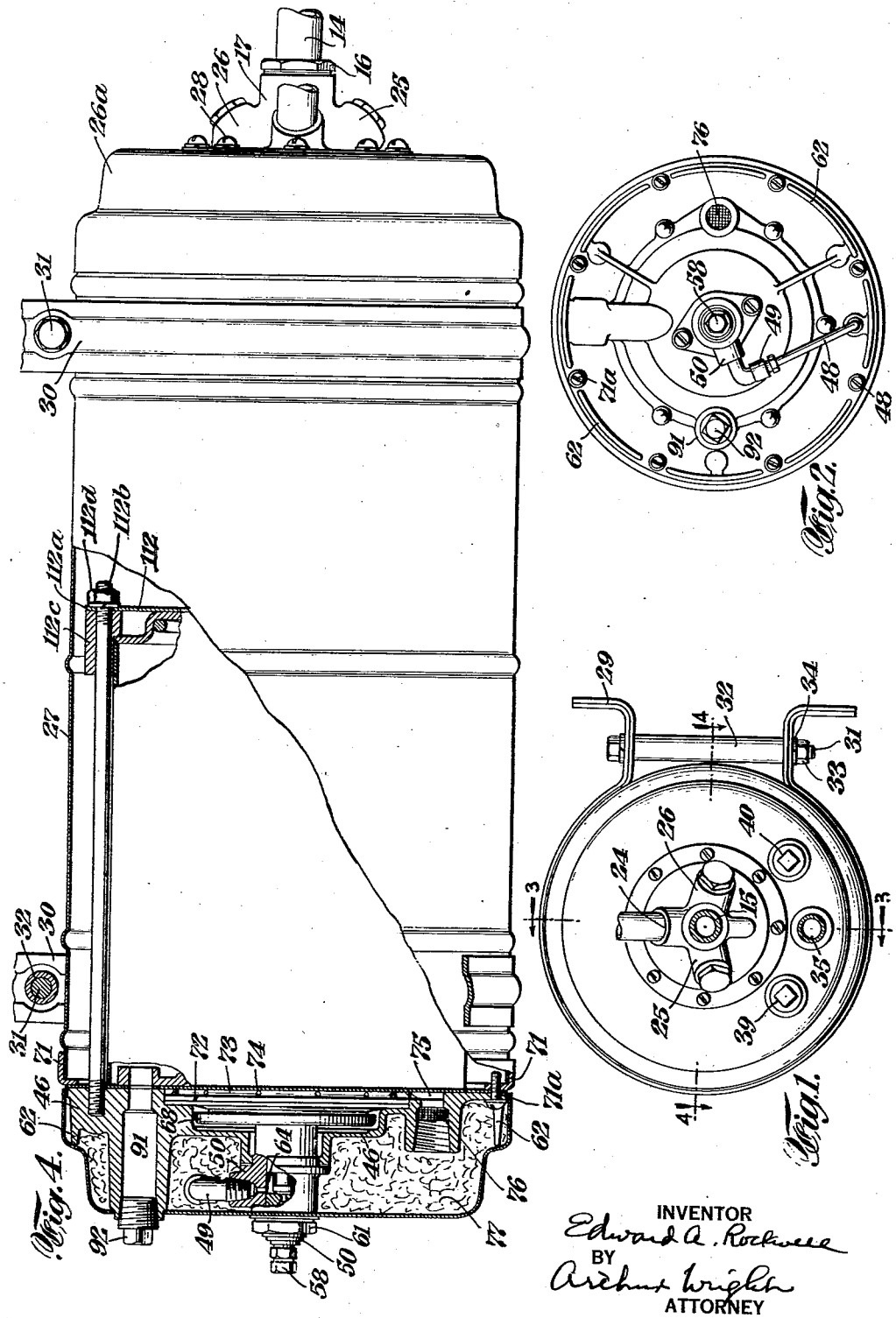
INVENTOR
Edward A. Rockwell
BY
Arthur Wright
ATTORNEY Aug. 14, 1945.  E. A. ROCKWELL  2,382,444
POWER UNIT APPARATUS
Filed July 3, 1940  7 Sheets-Sheet 2

INVENTOR
Edward A. Rockwell
BY Arthur Wright
ATTORNEY

Aug. 14, 1945.   E. A. ROCKWELL   2,382,444
POWER UNIT APPARATUS
Filed July 3, 1940   7 Sheets-Sheet 3

INVENTOR
Edward A. Rockwell
BY Arthur Wright
ATTORNEY

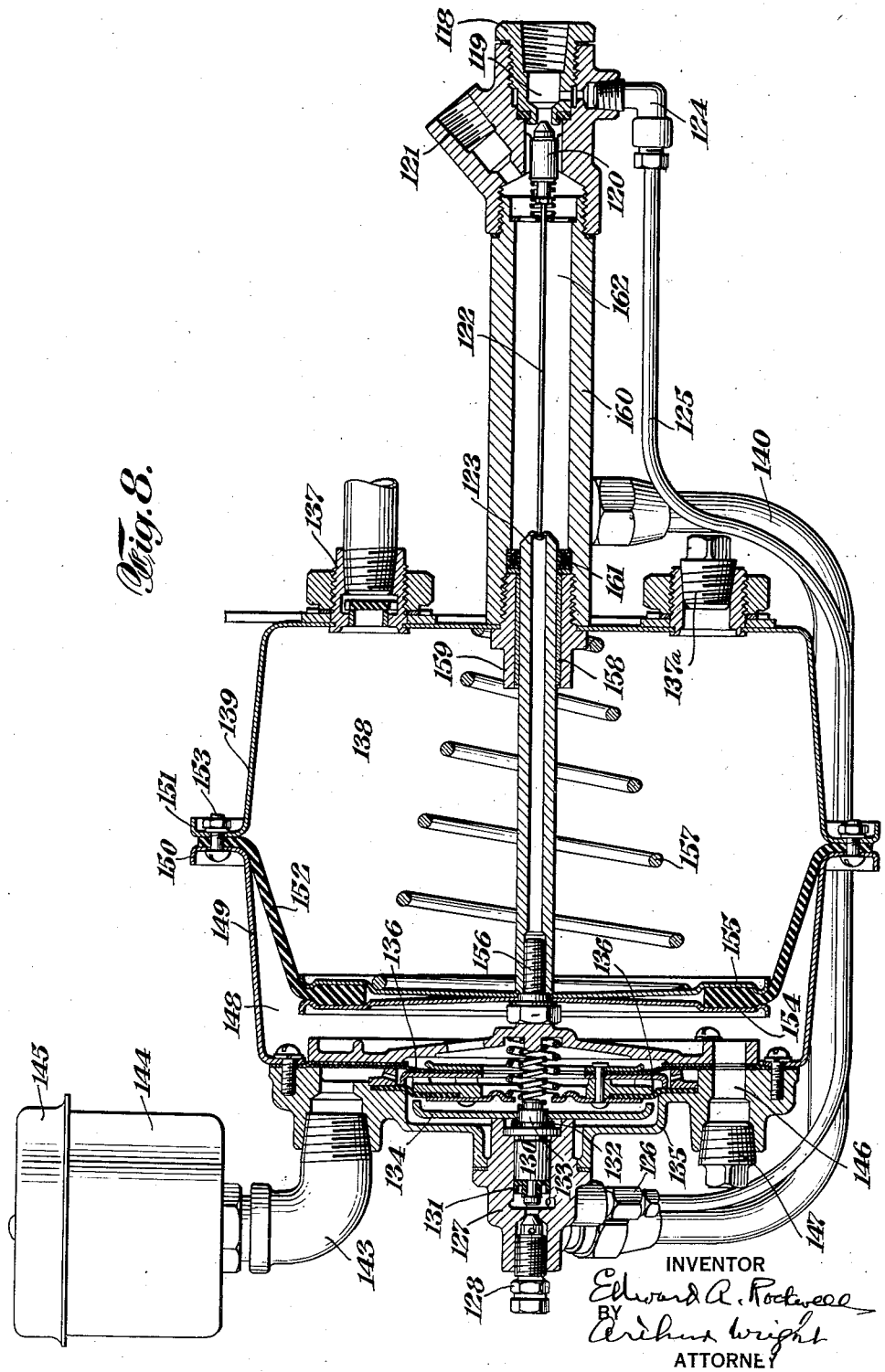

Aug. 14, 1945.  E. A. ROCKWELL  2,382,444
POWER UNIT APPARATUS
Filed July 3, 1940  7 Sheets—Sheet 5
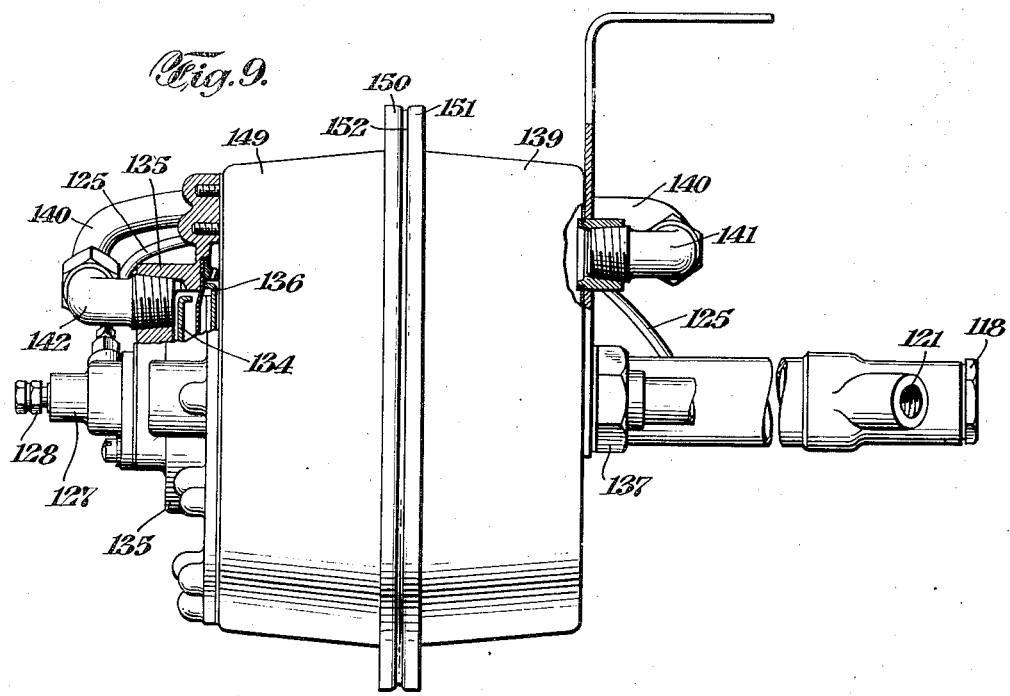
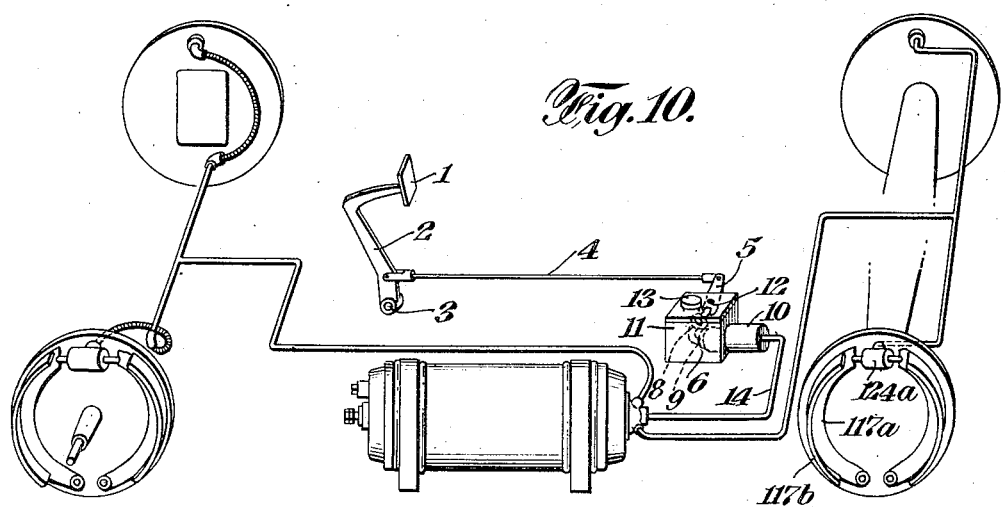
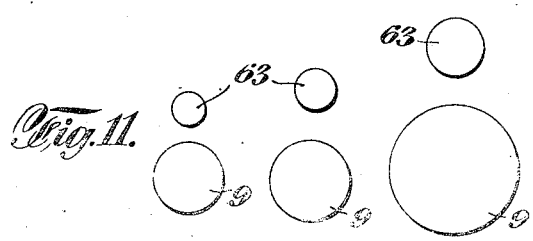
INVENTOR
Edward A. Rockwell
BY Arthur Wright
ATTORNEY

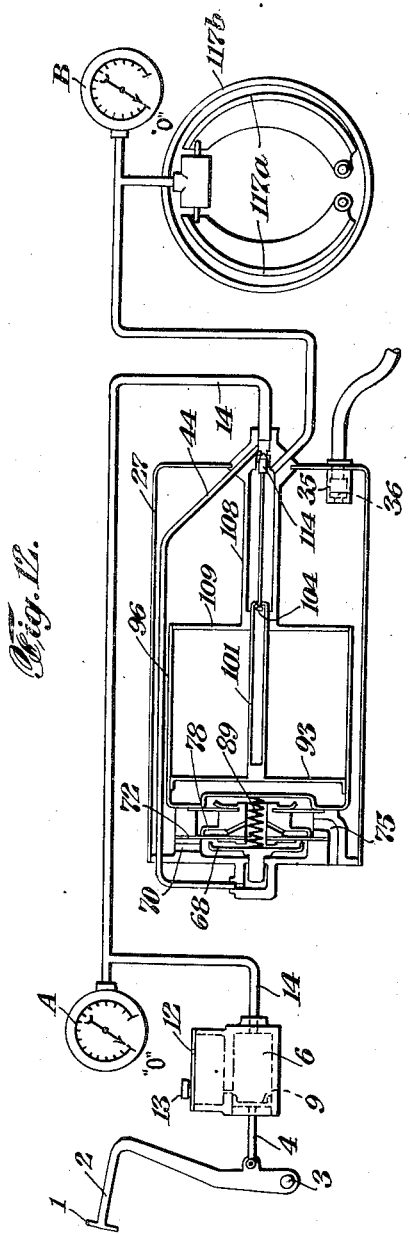
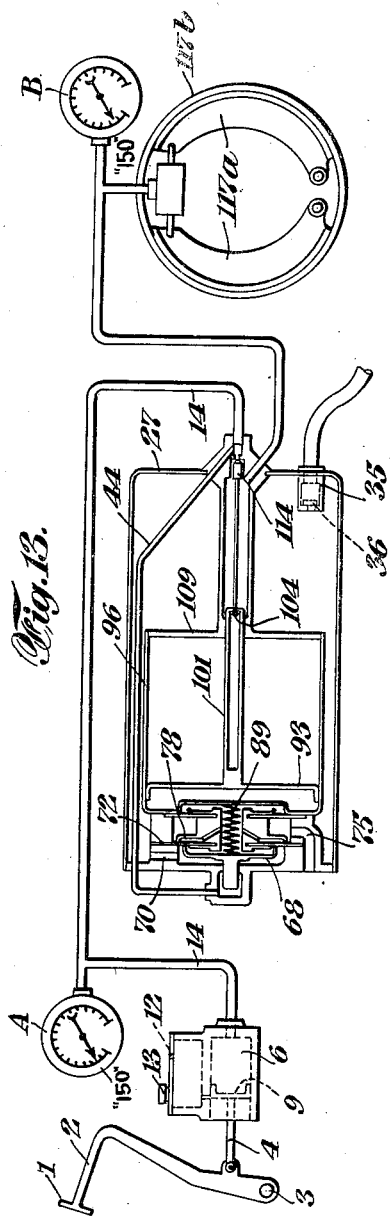

Aug. 14, 1945.      E. A. ROCKWELL      2,382,444
POWER UNIT APPARATUS
Filed July 3, 1940      7 Sheets-Sheet 7
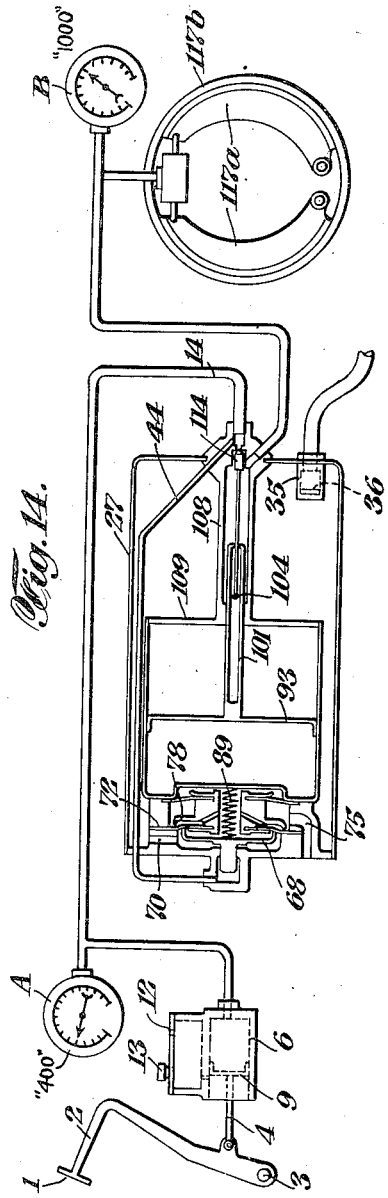
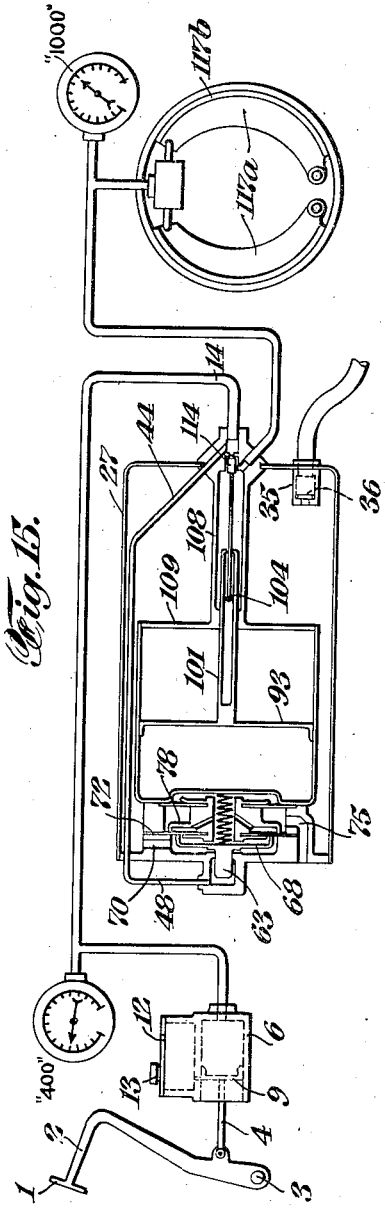
INVENTOR
Edward A. Rockwell
BY
Arthur Wright
ATTORNEY Patented Aug. 14, 1945

2,382,444

UNITED STATES PATENT OFFICE 2,382,444

POWER UNIT APPARATUS

Edward A. Rockwell, West Hartford, Conn., assignor to The New Britain Machine Co., New Britain, Conn., a corporation of Connecticut Application July 3, 1940, Serial No. 343,754

3 Claims. (Cl. 60—54.6)

My invention relates particularly to an apparatus designed to be used as a power unit and which is applicable for applying power to any desired purpose, but especially in connection with automotive vehicles, such for instance as accessories in the operation of automobiles.

The present application relates to a power unit which is an improvement over the power unit as set forth in my application upon Power system, Ser. No. 239,436, filed November 8, 1938.

The object of my invention is to provide a power unit of an advantageous character, for the operation of automotive vehicles and the accessories thereon and in fact wherever power is to be applied. One of the objects of my invention is to simplify the construction of such power units. Another object is to provide an improved form of apparatus for the operation of accessories, especially in regard to the follow-through or direct manual actuation thereof. Still another object is to provide means for eliminating, if desired, the piston and cylinder form of delivery of the power from the power unit to the accessories. Again, a further object is to reduce the size of the unit by providing an improved way of applying a pressure medium differing from the atmospheric pressure for the actuation of the parts which deliver the power to the accessories. Still another object is to simplify the assembly and alignment of the parts in the container. Further objects of my invention will appear from the detailed description of the same hereinafter.

While my invention is capable of embodiment in many different forms, for the purpose of illustration I have shown only certain forms of the same in the accompanying drawings in which—

Fig. 1 is an end elevation of one form of power unit made in accordance with my invention;

Fig. 2 is an end elevation of the other end of the unit;

Fig. 4 is a plan view, partly in section, of the same taken on line 4—4 of Fig. 1;

Fig. 8 is a vertical section taken on line 8—8 of Fig. 6;

Fig. 9 is a plan view, partly in section, taken on line 9—9 of Fig. 6;

Fig. 10 is a perspective view showing the master cylinder as connected to the power unit and pedal;

Fig. 11 is a diagrammatic view showing the relative sizes of the alternative plungers used as compared with the area of the master cylinder pistons;

Fig. 12 is a diagrammatic vertical section of the apparatus shown in Figs. 1 to 5, in the released position of the parts before the pedal is operated;

Fig. 13 is a similar view showing the initial operation of the pedal in the position in which the manual pressure is conveyed to the brake shoes for moving them into position by the manual pressure before applying the braking force by the power from the power unit;

Fig. 14 is a similar view showing the pedal moved farther so as to apply the braking force; and Fig. 15 is a similar view showing the holding position, that is to say with the desired amount of braking force applied, and showing the inlet and outlet valves closed.

Figure 3:
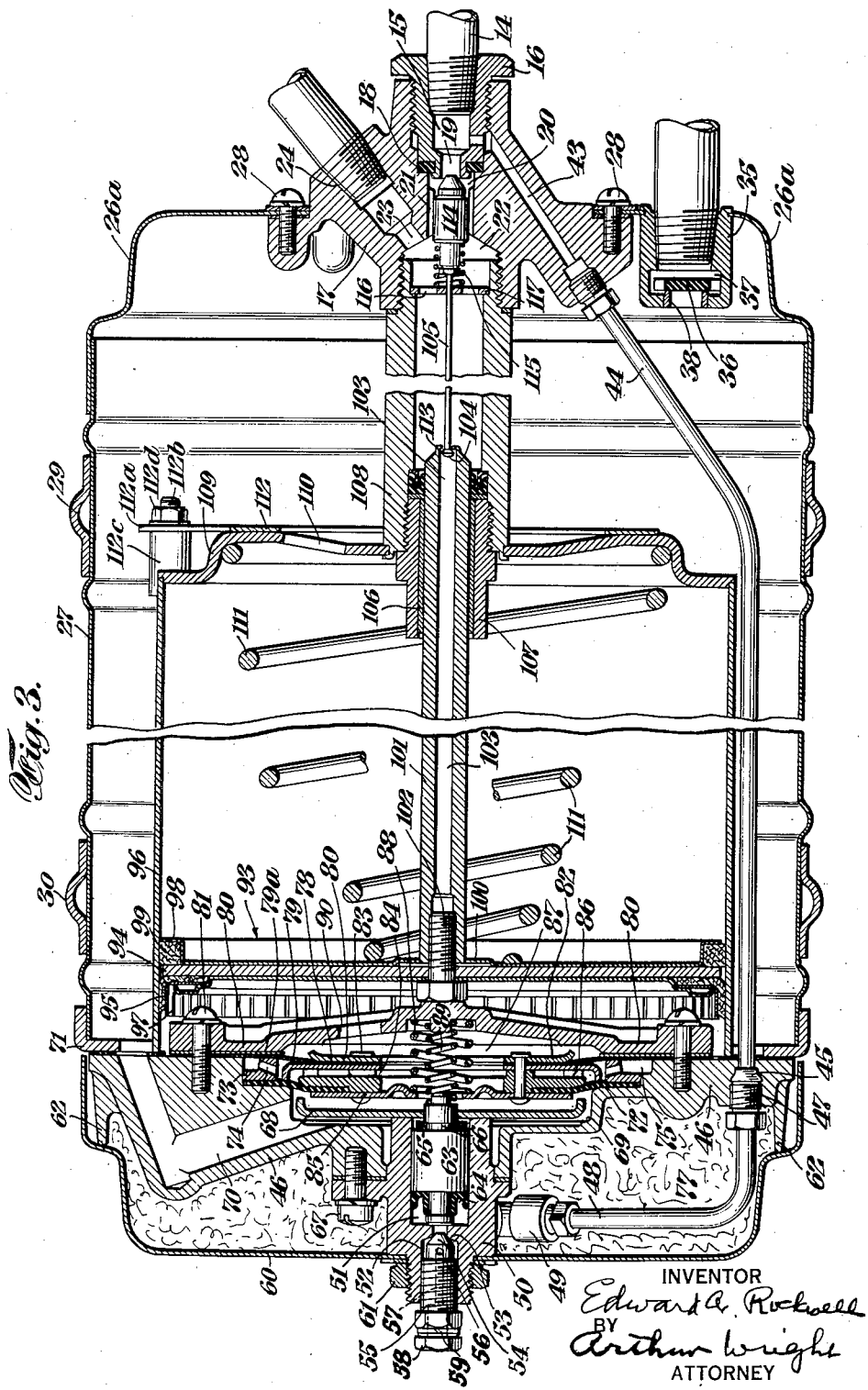
Fig. 3 is a longitudinal vertical section of the same taken on line 3—3 of Fig. 1.
Figure 7:
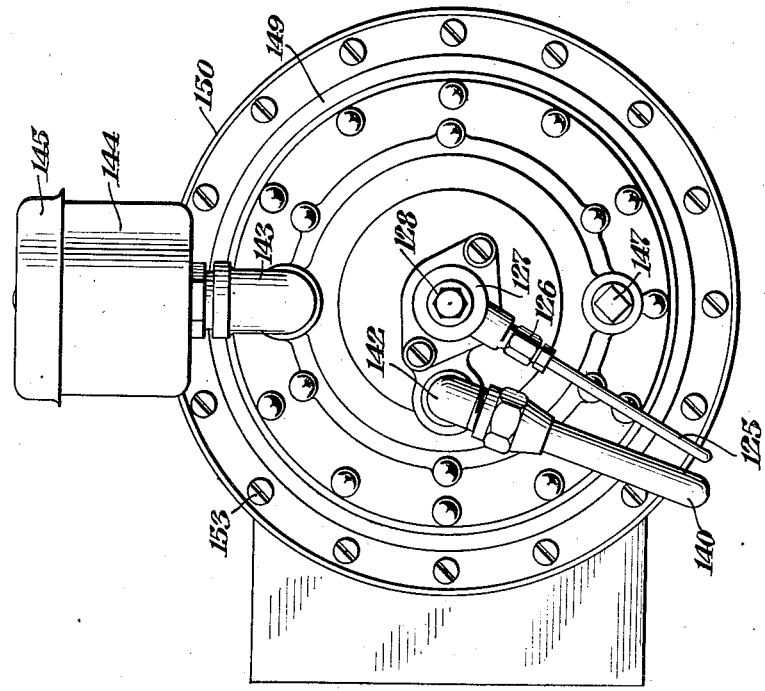
Fig. 7 is an elevation of the other end thereof.
Figure 5:
Fig. 5 is a transverse section of the spring ring used for retaining the leather gasket on the piston in the power cylinder before being bent into angular position.
Figure 6:
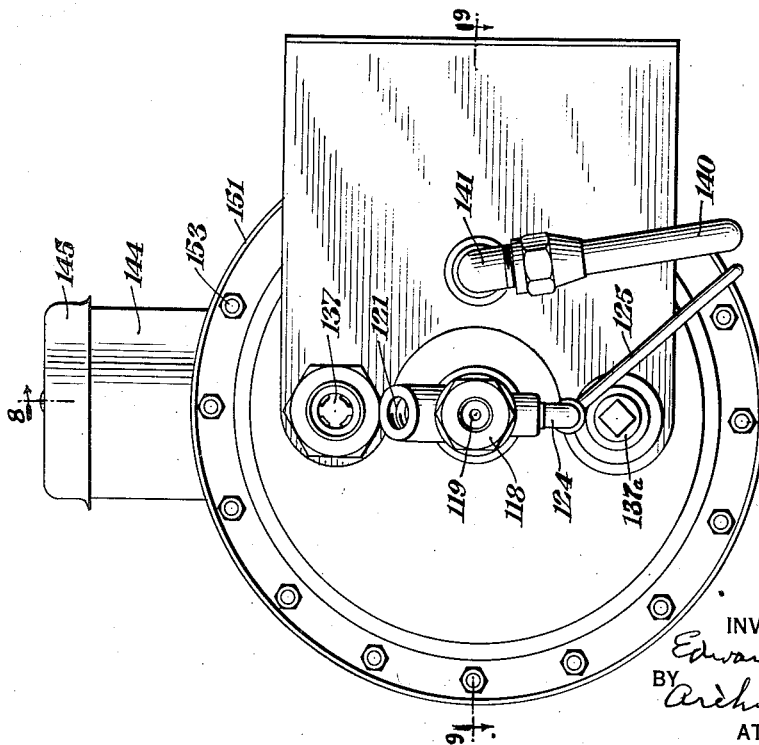
Fig. 6 is an end elevation of a modified form of my invention.

Referring first to the form of my invention shown in Figs. 1 to 5, and 10 to 15, I have shown a pedal 1 mounted on a lever 2 which is pivoted on a shaft 3 carried by a chassis of an automobile, not shown. A link 4 is attached to said lever 2 intermediate its ends so as to give any desired pedal ratio movement of the pedal 1 to the brake-operating link 4. The said link 4 is pivotally connected to an operating lever 5 of a master cylinder 6 which may be any desired form of master cylinder but, for example, such as disclosed in the patent to Loughead, No. 1,707,063, granted March 26, 1929. The lever 5 is carried on a shaft 7 passing into the master cylinder 6, which has an arm 8 for operating a piston 9 carried in a cylinder 10 beneath a storage chamber 11 having a vent 12 and a filler opening 13.

When the pedal 1 is moved downwardly the piston 9 is adapted to discharge the liquid of the master cylinder from a pipe 14 to an inlet opening 15 located in a removable fitting 16 screw-threaded in a casting 17 at one end of the power unit. The fitting 16 carries on its inner face a rubber seal 18 and the liquid from the fitting is conveyed by a port 19 therein to a valve passageway 20 having a plurality of longitudinal channels 21 therein so as to communicate with a chamber 22 in said casting and thence initially to convey the liquid under manual pressure by a passageway 23 to an outlet port 24 which serves the purpose of delivering modulated hydraulic pressure liquid manually, or from the power apparatus hereinafter described, to the accessory or part to be operated, as for instance the wheel brakes of the automobile having the usual wheel brake cylinders 24a for operating the brake shoes, for example as disclosed in my application aforesaid.

It will be noted that the said casting 17 carries additional alternative outlet ports 25 and 26 constructed the same as the outlet port 24 except that they are located at different angles so that any one of them may be connected in the most convenient way to the line leading to the accessory to be operated. Furthermore, the said casting 17 supports an end cover 26a secured to an outer shell 27, enclosing the parts of the power unit, by means of screws 28, the said shell 27 being supported in any desired manner, by straps 29 and 30 secured together by bolts 31, spacing sleeves 32, nuts 33 and lock washers 34, on the automobile chassis. Adjacent to the casting 17 there is provided a vacuum inlet fitting 35 which contains a check valve 36, within a valve chamber 37 therein, adapted to seat against a bushing 38. In this way the vacuum, as for example from the engine manifold or any other desired source, is supplied to the interior of the shell 27. Adjacent to the vacuum inlet fitting 35 there are two screw plugs 39 and 40 screw-threaded into cylindrical fittings 41 and 42 constructed exactly like the fitting 35 except that the valve seat and valve are omitted, these being provided to supply vacuum for a trailer connection or any other desired purpose.

The hydraulic liquid received from the line 14 also passes from the inlet opening 15 through a passageway 43 in the casting 17 and thence by a pipe 44 into an opening 45 in a valve casing 46 into which there is screw-threaded a fitting 47 for a pipe 48 which is connected by an angular pipe 49 into the side of a plunger housing 50 so as to communicate with a chamber 51 therein. The said chamber 51 also communicates with a passageway 52 adjacent to a valve seat 53 provided for receiving a conical end 54 of a bleeder valve 55 screw-threaded into the plunger housing 50. A plurality of transverse ports 56 extend through the reduced end of the bleeder valve 55 so as to communicate with a longitudinal passageway 57 in the bleeder valve, which is normally closed by a screw plug 58 held in position by a lock washer 59. When the plug 58 is removed and the valve 55 unscrewed to unseat the bleeder valve, the accumulated air is relieved through the passageway 57. The said plunger housing 50 supports in place a cover plate 60 by means of a nut 61, the periphery of which rests upon a plurality of teeth 62 on the valve casing 46.

The hydraulic liquid in the chamber 51 thus communicates with one face of a cylindrical plunger 63 having a rubber seal 64 on a reduced end thereof. As will be seen in Fig. 11, the plunger 63 may be made in several different sizes so as to be capable of being substituted in the apparatus with an appropriate size of plunger housing 50 so that by the increase in the area of the plunger 63 the power unit can be adapted to the operation of larger and heavier vehicles, such as trucks, in which a large volume of liquid is required for operating the wheel brakes thereon. In this Fig. 11 there are illustrated, by way of example, three diameters of the plungers 63 with the relative diameters of the master cylinder pistons used therewith, it being understood that the pedal lever ratio for each set of diameters will be adjusted therewith to always obtain approximately the same ratio of force from the piston 9 to the force obtained from its plunger 63 in each of the three pairs of pistons and plungers. Unless this reduced area of the plunger 63, as compared with the master cylinder piston, were used the liquid from the master cylinder would be used up faster than desirable in obtaining an effective control. The other end of the plunger 63 carries a gasket 65 adjacent to a reduced end 66 thereon.

It will be noted that the plunger housing 50 fits within and is fastened to the valve casing 46 by screws 67 and one end of the plunger housing 50 acts as a stop or support for an outlet valve 68 which is attached to the reduced end 66 of said plunger 67. The outlet valve 68 is arranged for movement within a chamber 69 in the valve casing 46, which communicates with a passageway 70 in the valve casing 46 and which passes through a supporting ring 71 fastened to one end of the outer shell 27 and to the valve casing 46 by screws 71a, thus giving access of the vacuum within the shell 27 to the outlet valve chamber 69. When the plunger 63 is moved forwardly by the liquid in the chamber 51 this causes the outlet valve 68 to seat against a diaphragm 72 of rubber or other suitable material, which is clamped at its periphery against one face of the valve casing 46 by a ring 73 having ports 74 therein. These ports 74 permit the passage of atmospheric air pressure to be received in the apparatus from a passageway 75 covered by a screen 76 which communicates with a chamber 77 filled with horse-hair and which is open to the air through the teeth 62 and the other periphery of the cover 60 spaced from the valve casing 46, as shown in Fig. 3.

This atmospheric air is adapted, when the outlet valve 68 is seated, to enter beneath the periphery of an inlet valve 78 which is normally seated on one face of the said diaphragm 72. This inlet valve 78 is supported on the inner periphery of a thin oxidized oil woven fabric ring 79 backed by a paper gasket 79a, which latter is held in position against one face of the valve casing 46 by means of a clamping plate 80 and screws 81. Furthermore, the said inlet valve 78 is clamped in position on the ring 79 by a clamping ring 82 and rivets 83 which pass not only through the inlet valve 78 but also through a ring 84 and a spring-supporting ring 85 which is clamped thereby against one face of the diaphragm 72.

It will be noted, also, that there are passageways 86 which pass radially from the outer portion of the inlet valve 78 inwardly to the inside of the ring 84 so as to communicate with a chamber 87 located beneath the outlet valve 68. In this chamber 87 there is a spring 88 supported at one end upon the ring 85 and at the other end upon the clamping plate 80 to normally force the inlet valve 78 to the left in Fig. 3. Also within the chamber 87 there is an inner spring 89, one end of which is seated on the said clamping plate 80 and the other end of which surrounds a small extension on the end of the plunger 63. The clamping plate 80 has perforations 90 through the same to permit the passage of the vacuum or air received in the chamber 87.

Also passing through the clamping ring 80 and the valve casing 46 there is a passageway 91 closed by a screw plug 92 for supplying modulated pressure for a trailer connection, also as an opening for the insertion of a lubricant.

When the outlet valve 68 has been closed and the inlet valve 78 opened, the pressure of the atmospheric air is then received on one face of a piston 93 so as to move the same. This piston carries on one face a clamping disk 94 for holding in place a leather gasket 95, of right-angle cross-section, which is held outwardly against the inner face of a cylinder 96 by a spring ring 97 which is in the form merely of a succession of shapes of a sharp angle S with flat portions facing the leather gasket 95 outwardly. The cylinder 96 is supported in place within the inner periphery of the supporting ring 71. On the other face of the piston 93 there is a plate 98 for holding in place a felt ring 99 which also bears on the inner periphery of the cylinder 96. The said plate 98 has a circular off-set portion 100 around a plunger 101 on which both of the plates 94 and 98 are fastened by a screw 102.

Within the plunger 101 there is provided a longitudinal passageway 103 for receiving a flanged end 104 of a rod 105 of small diameter, and said plunger 101 is supported for reciprocation within a bushing 106 located in a cylindrical fitting 107 screw-threaded into a pressure cylinder 108, which latter carries a disk 109 having perforations 110 to act as a support for the cylinder 96 and also for one end of a helical spring 111, the other end of which is supported on the face of the plate 98. This spring is made stiff enough so that the piston 93 will not be moved until the brake shoes have been moved into position manually, even though the valve 78 may have admitted some air.

There is also provided on the outside of the cylinder 108 and against the face of the disk 109, a triangular spider-ring 112 having three ears 112a to receive screws 112b provided with spacing-keepers 112c and nuts 112d so as to effectively clamp the disk 109 to the cylinder 96.

Within the end of the piston 101 there is an annular shoulder 113, so that when the piston 98 is moved to the extreme left, in Fig. 3, the shoulder 113 contacts with the flange 104 so as to pull a valve member 114, screw-threaded to the other end of the rod 105, off its seat on the inlet fitting 16. A spring 115 around a reduced end of the valve 114, and which is supported at the other end of the spring upon a spider 116 carried on a shoulder 117 in the cylinder 108, serving to hold the spring 111 in position in the assembly of the parts so that all these connected parts can be inserted as a whole in the container 27, normally forces the valve 114 against its seat when not pulled away from the seat by the shoulder 113.

The diagrammatic views of this form of my invention in Figs. 12 to 15 show the different positions of the parts in th course of the application of the brake by the pedal. In these views I have shown a gauge A indicating the manual pressures of the hydraulic liquid and a gauge B indicating the pressures in the liquid as applied to the brake shoes.

Fig. 12 shows the parts in released position before the operation of the pedal 1, in which position both gauges A and B indicate zero pressure. In this position the inlet valve 78 is seated on the diaphragm 72 while the outlet valve 68 is in open position and the valve 114 is in open position, with the brake shoes 117a withdrawn from the brake drums 117b.

Fig. 13 shows the position of the parts in the initial operation of the pedal 1, in which the inlet valve 78 remains seated while the outlet valve 68 has been moved into seated position, and the brake shoes 117a have been moved into intimate contact with the brake drums 117b, both the gauge A and the gauge B indicating 150 pounds pressure per square inch.

Fig. 14 shows the effect of a further movement of the pedal 1 which results in unseating the inlet valve 78 while the outlet valve 68 still remains seated, and with the valve 114 now being seated due to the force of the valve spring 115. In this position the manual pressure on the gauge A is 400 pounds as applied manually whereas the pressure from the power unit applied to secure the braking effect is, for instance, 1000 pounds, as shown by the gauge B.

In Fig. 15 I have shown the parts in holding position, that is to say where, at any given desired amount of pressure, the braking force is being applied, for example 1000 pounds per square inch, as shown on the gauge B, as compared with the 400 pounds per square inch, as shown on the gauge A. It will be understood that the pressure on the gauge B can in this way be held at any desired point on the scale thereof and when so held the valves 68 and 78 are in seated position. Upon release of the pedal 1 the outlet valve 68 will be opened by its spring 89 to restore the gauges to zero and the brake shoes 117a to their initial positions.

Furthermore, it will be noted that all the internal parts within the outer shell 27 are arranged to be assembled in alignment together to obtain accurate alignment and inserted as a whole in the outer shell 27. Also, in the assembling thereof, as the disk 109 is rotatable as to the cylinder 96 the screw-threads on the two ends of the cylinder 108 can be always moved to their end position as the disk 109 will fit on the cylinder 96 no matter what is their respective rotated position.

The modification of the apparatus as shown in Figs. 6 to 9, is provided with the same connections to the master cylinder, wheel brakes and vacuum as in the form of the power unit shown in the preceding figures. For this purpose there is provided an inlet fitting 118 for the liquid from the master cylinder, which communicates with a valved passageway 119 having a spring-pressed valve 120 therein arranged to supply modulated hydraulic pressure to the wheel brakes from a port 121, also a rod 122 and a plunger 123, all of these parts being constructed substantially the same as in the form shown in the preceding figures.

In this instance, however, the manual pressure liquid from the master cylinder, for applying the increased power, passes through an elbow 124 and thence through a pipe 125 to a fitting 126 in a plunger housing 127 having a bleeder valve 128 therein constructed the same as the bleeder valve 54, previously described. The bleeder valve 128 is carried in the plunger housing 127, in which there is located a plunger 130 adapted to be moved by the hydraulic pressure from the pipe 125.

Both the plunger 130 and the plunger housing 127 may be substituted by one or more plungers of larger diameter and with the appropriate housing therefor, as previously described in connection with the preceding figures. The plunger 130 has a rubber seal 131 on one face and a rubber gasket 132 on the other face and said plunger 130, furthermore, has a reduced end 133 to which there is fastened an outlet valve 134 in a valve casing 135 containing an inlet valve 136, the valves 134 and 136 being supported and constructed the same as in the form of the invention described in connection with the preceding figures.

In this instance, however, the vacuum is received through a check valved fitting 137 into a vacuum chamber 138 within a dished casing 139 and is thence conveyed outside of said casing by a pipe 140 from an elbow 141 on the dished casing 139 and thence to an elbow 142 on the valve casing 135, so as to admit vacuum thereto. Opposite to the fitting 137 there is a screw plug 137a for the same purpose as the plugs 39 and 40.

The atmospheric air pressure is admitted to the outside of the inlet valve 136 from a right-angle pipe 143 leading from a breather chamber 144 filled with horse-hair and carrying a vented cover plate 145. Opposite to the pipe 143 the valve casing 135 carries an opening 146 closed by a plug 147 for supplying modulated pressure to a trailer or any other purpose. The air pressure, after being admitted by the seating of the valve 134 and unseating of the valve 136, enters a chamber 148 formed by a dished casing 149 having an annular flange 150 adapted to be clamped to an annular flange 151 on the dished casing 139 so as to support a flexible wall 152 of rubber or other material between said flanges by means of screws 153.

The said wall 152 is in the form of a ring, the inner periphery of which is clamped between plates 154 and 155 by a screw 156 passing through said plates 154 and 155 and into the plunger 123. Around the plunger 123 there is a helical spring 157, one end of which is seated against the plate 155 and the other end against the dished casing 139. A bushing 158 supports the free end of the plunger 123 and said bushing is carried within a sleeve 159 clamped to the dished casing 138 by a cylinder 160 screw-threaded onto said sleeve 159. A rubber seal 161, within the cylinder 160, provides a sealed pressure chamber 162 from which the liquid is supplied to the wheel brakes through the passageway 121 when the power is being applied by the force of the plunger 123 to the right, in Fig. 8.

It will be understood that in carrying out this operation, the rod 122 and the valve 120, which is supported in the same manner as in the form of the invention shown in the preceding figures, carries out the action in the same way as in said preceding figures.

In the operation of the apparatus shown in Figs. 1 to 5, 10 to 15, when the pedal 1 is moved downwardly the liquid from the master cylinder 6 is conveyed by the pipe 14 to the inlet 15 and, the valve 114 being open because of having been withdrawn by the shoulder 113 pulling the rod 105 to the left, the said liquid passes through the channels 21 around the valve 114 and thence is conveyed through the outlet port 24 to the brake cylinders of the wheel brakes, thus enabling them to be operated manually to move the brake shoes initially into snugly fitting position for the subsequent application of the power from the power unit to produce the braking force, or in the case of the failure of the power unit, then manually by forcing a further amount of the liquid through the outlet port 24.

Assuming that the brake shoes have thus been moved manually into position preparatory to further applying the braking force, the liquid, which has also simultaneously been conveyed by the passageway 43, pipe 44 and pipe 48 to the chamber 51, upon receiving increased manual pressure will force the plunger 63 to the right, thus seating the outlet valve 68 and then unseating the inlet valve 78 so as to admit atmospheric pressure from beneath the cover 77, through the screen 76, passageway 75 and holes 74 beneath the inlet valve 78 and thus breaking the vacuum which is on the left of the piston 93, in Fig. 3. Prior to this, it will be understood that the vacuum has been present on both sides of the piston 93.

Upon the application of the atmospheric air pressure to the left face of said piston 93, the latter will be forced to the right against the opposition of the spring 111, thus releasing the shoulder 113 from the flange 104 and permitting the valve 115 to seat against the inlet fitting 17. The supply of the manual hydraulic pressure liquid is thus cut off from the passageways 21 and from the inlet opening 15 leading to the brakes, and further manual pressure thereafter proceeds only through the succession of passageways beginning with the passageway 43, so as to further admit or cut off, as desired, the atmospheric air pressure to the left face of the piston 93 and supplying the coordinate pressure thus produced, which is greatly magnified due to the small size of the plunger 101 compared to the diameter of the piston 93, through the outlet port 24 to the wheel brakes. In this way modulated pressure coordinated to the reaction thereof on the foot is applied to provide the braking force to the vehicle wheels.

The pressures thus applied to produce the braking force on the brakes can be lessened in the off modulation of the brakes similarly by a release, to the extent desired, of the manual pressure applied for causing the piston 93 to be moved by the atmospheric air pressure, and thus at all times, both in the on and off modulation, the degree of the braking force can be carefully and minutely coordinated to the reaction force on the foot giving a nicety of control at all times, which can be regulated by the feel of the reaction pressures on the foot.

Of course, when the desired braking pressure is attained at any particular time the piston 93 is held at this particular position as the inlet valve 78 will become seated to trap the atmospheric pressure in the unit to the extent to which it has been admitted and of course if further release of the said atmospheric pressure is desired, this is accomplished by permitting the outlet valve 68 to open for the release of the pressure as desired.

The apparatus can be readily adapted to the operation of larger vehicles or trucks, as desired, by using the larger plungers 63 as well as the larger plunger housings with larger master cylinder pistons 9 to give a greater volume of liquid for the actuation of the parts, while substantially maintaining the same ratio of the force applied by the plunger 63 as compared with the force delivered by the piston 93.

The form of my invention shown in Figs. 6 to 9 operates in substantially the same manner. In this instance, however, instead of receiving the atmospheric air pressure on the piston 93, as previously described, this is received on the face of the plunger formed by the two plates 154 and 155 on the left face thereof, in Fig. 8, the flexible wall 152 permitting the movement of said plunger to the right in said figure in opposition to the spring 157. In this instance, also, the vacuum is conveyed from one face of said plunger to the other by the pipe 140. This form of my invention has the advantage of being somewhat more compact and more easily constructed because of fewer parts and the smaller relative dimensions of the same. Also, this form can be used where less reserve is needed, as for instance on smaller vehicles.

While I have described my invention above in detail I wish it to be understood that many changes may be made therein without departing from the spirit of the same.

I claim:

1. A power unit having an inlet for manually controlled liquid, an outlet for the delivery of liquid from the unit to a part to be moved, an inlet for pressure fluid differing from the atmospheric pressure, valve means for controlling the pressure of the delivered liquid, a movable wall actuated by said pressure fluid and controlled by said valve means, a spring for retracting the same, a plunger connected to said movable wall, a valve for controlling the liquid received from said inlet, having a lost-motion connection to the plunger for retracting the valve, a hydraulic connection from said last mentioned value to said valve means, a cylinder in which the plunger operates, having means to support the lost-motion valve and retain the movable wall against said spring, and a container for said pressure fluid in which the assembled movable wall, spring, plunger, cylinder, valve and valve supporting means are adapted to be inserted as a whole.

2. In a device of the character indicated, a fluid pressure cylinder, a fluid pressure actuated piston therein, an hydraulic cylinder concentric with said first cylinder and secured thereto, a plunger in said hydraulic cylinder and secured to said fluid pressure actuated piston to be actuated by the latter, a cylinder head fitting on said hydraulic cylinder, an hydraulic inlet to said hydraulic cylinder and located in said fitting, a check valve concentric with said hydraulic plunger for closing said inlet, a connection between said plunger and check valve for lifting the latter from its seat when said plunger is retracted, an hydraulic outlet in said fitting, a valve fitting at one end of said fluid pressure cylinder, valve means thereon for controlling fluid pressure on said fluid pressure actuated piston, and through bolts extending the length of said fluid pressure cylinder for securing said valve fitting, said fluid pressure cylinder, hydraulic cylinder and said cylinder head fitting together in a unitary whole.

3. In a device of the character indicated, a fluid pressure cylinder, a fluid pressure actuated piston therein, an hydraulic cylinder concentric with said first cylinder and secured thereto, a plunger in said hydraulic cylinder and secured to said fluid pressure actuated piston to be actuated by the latter, a cylinder head fitting on said hydraulic cylinder, an hydraulic inlet to said hydraulic cylinder and located in said fitting, a check valve concentric with said hydraulic plunger for closing said inlet, a connection between said plunger and check valve for lifting the latter from its seat when said plunger is retracted, an hydraulic outlet in said fitting, a valve fitting at one end of said fluid pressure cylinder, valve means thereon for controlling fluid pressure on said fluid pressure actuated piston, an air tight casing containing said fluid pressure cylinder and said hydraulic cylinder, said casing being hermetically sealed about and to said cylinder head fitting on said hydraulic cylinder, a fluid pressure connection to said casing, and a fluid pressure connection between said casing and said valve fitting.

EDWARD A. ROCKWELL.